United States Patent
Denny et al.

(10) Patent No.: US 6,539,434 B1
(45) Date of Patent: *Mar. 25, 2003

(54) UOWE'S RETRY PROCESS IN SHARED QUEUES ENVIRONMENT

(75) Inventors: George Steven Denny, San Jose, CA (US); Gerald Dean Hughes, Morgan Hill, CA (US); Michael Bruce Kennedy, San Jose, CA (US); Khiet Quang Nguyen, San Jose, CA (US)

(73) Assignee: IBM Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/200,922

(22) Filed: Nov. 30, 1998

(51) Int. Cl.$^7$ .............................................. G06F 17/40
(52) U.S. Cl. .............................. 709/248; 707/8; 707/10
(58) Field of Search ................................ 709/310–320, 709/108, 248; 707/1–10; 714/4

(56) References Cited

U.S. PATENT DOCUMENTS

| | | | |
|---|---|---|---|
| 5,319,774 A | 6/1994 | Ainsworth et al. ........... 714/20 |
| 5,363,505 A | 11/1994 | Maslak et al. ............... 709/100 |
| 5,410,684 A | 4/1995 | Ainsworth et al. ........... 714/18 |
| 5,463,736 A | 10/1995 | Elko et al. ................... 710/28 |
| 5,561,809 A | 10/1996 | Elko et al. ................... 709/213 |
| 5,649,185 A | 7/1997 | Antognini et al. ............. 707/9 |
| 5,706,432 A | 1/1998 | Elko et al. ................... 709/213 |

OTHER PUBLICATIONS

Orfali et al., "The Essential Client/Server Survival Guide," Wiley Computer Publishing, Chapter 16, pp. 257–274, 1996.*

* cited by examiner

Primary Examiner—St. John Courtenay, III
(74) Attorney, Agent, or Firm—Sughrue Mion, PLLC

(57) ABSTRACT

An UOWE is created to represent a message which is put out to the coupling facility. If it is a committed message and the PUT failed for some reason, the UOWE is flagged for "retry". These retry UOWEs will accumulate over time. The retry logic analyzes each "retry" UOWE, extracts the log token from this UOWE, uses this log token to read a specific log record from the IMS log data set and attempts to put the committed message to the central facility again.

14 Claims, 3 Drawing Sheets

UOWE'S RETRY PROCESS IN SHARED QUEUES ENVIRONMENT

I. DESCRIPTION OF THE INVENTION

IA. Field of the Invention

This invention relates to computer operating systems. More specifically, this invention relates to techniques for handling IMS messages in the same execution environment or different execution environments. The invention provides a method for retrying a CQS PUT command, which puts messages into the coupling facility, for messages for which the PUT command failed.

The invention is embodied in a method for retrying the PUT command for a failed message using retry logic that operates on the unit of work element containing information about the failed message.

IB. Background of the Invention

This patent application is related to the following U.S. patent documents:

- U.S. Pat. No. 5,410,684, entitled "LOG NAME EXCHANGE FOR RECOVERY OF PROTECTED RESOURCES" filed Sep. 20, 1993 by M. K. Ainsworth et al, continuation of Ser. No. 525,430 filed May 16, 1990;
- U.S. Pat. No. 5,363,505, entitled "LOCAL AND GLOBAL COMMIT SCOPES TAILORED TO WORK UNITS" filed Jun. 9, 1993 by B. A. M. Maslak et al, continuation of Ser. No. 525,426 filed May 16, 1990;
- U.S. Pat. No. 5,319,774, entitled "RECOVERY FACILITY FOR INCOMPLETE SYNC POINTS FOR DISTRIBUTED APPLICATION" filed May 16, 1990 by M. K. Ainsworth et al;
- U.S. Pat. No. 5,436,736, entitled "COUPLING FACILITY FOR RECEIVING, COMMANDS FROM PLURALITY OF HOSTS FOR ACTIVATING SELECTED CONNECTION PATHS TO I/O DEVICES AND MAINTAINING STATUS THEREOF" filed Oct. 18, 1994 by D. A. Elko et al;
- U.S. Pat. No. 5,706,432, entitled "MECHANISM FOR RECEIVING MESSAGES AT A COUPLING FACILITY" filed Jun. 7, 1995 by D. A. Elko et al;
- U.S. Pat. No. 5,561,809, entitled "IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION" filed Apr. 11, 1995 by D. A. Elko et al.

The above listed patents and the present application are owned by one and the same assignee, International Business Machines Corporation of Armonk, N.Y. and are incorporated herein by reference.

The present invention can be used in a network of computers that form part of a distributed computer system. Such a distributed computer system typically includes a central host computer and a plurality of virtual machines or other types of execution environments. A real machine includes a central processor and associated virtual machines. Within each such real machine a central computer, that includes the central processor, manages central resources of the real machine including a large memory and communication facilities. The central processor controls the access between the virtual machines and the resources so that each virtual machine appears to be a separate computer. The real machines may in turn be interconnected through a network into a global network to enable communications between applications running in execution environments belonging to different real machines. Each virtual machine is provided with its own conversation monitor system (CMS) to interact with (i.e., receive instructions from and provide prompts for) users of the virtual machine. CMS is a portion of the system control program. Certain resources such as shared file system (SFS) and shared structured query language (SQL) relational databases may be accessed by any user of the virtual machine and the host.

Each such system is a real machine. Two or more real machines can be connected to form a network, and data can be transferred using communications between virtual machines belonging to different real machines. Such a transfer is made via communication facilities such as AVS Gateway and VTAM facilities ("AVS Gateway and VTAM" are trademarks of IBM Corp. of Armonk, N.Y.).

Application running on any of the virtual machines may communicate with the coupling facility as well as with other applications running on the same or different virtual machines. Applications communicate by sending a message to the coupling facility. Like files and databases, communications are also protected resources.

An application can make changes to a database, file resource, or state of communication by first making a work request defining the changes. In response to a request for a change, provisional changes are made in shadow files while the original database or file is unchanged. When changes are made to shadow files, they are not committed. The application have the option of requesting that the changes be committed to validate the shadow file changes. Thereby, the changes made to the shadow file is transferred to the original file.

A one-phase commit procedure is often utilized to commit changes to the original file. The one-phase commit procedure consists of a command to commit changes to the resource as contained in the shadow file. When resources such as SFS or SQL resources are changed, the commits to the resources can be completed in separate one-phase commit procedures. In the vast majority of cases, all resources will be committed using separate procedures without error or interruption. However, if a problem arises during a one-phase commit procedure, some of the separate commits may have already been completed while others may not, causing inconsistencies. Such a problem can be solved only by rebuilding resources. However, the cost of rebuilding non-critical resources is more than compensated by the improved efficiency of the one-phase commit procedure.

A two-phase commit procedure is required to protect critical resources and critical communications. For example, assume that a first person's checking account is represented in a first database and a second person's savings account is represented in a second database. If the first person writes a check to the second person and the second person deposits the check in his/her savings account, the two-phase commit procedure ensures that if the first person's checking account is debited then the second person's savings account is credited or else neither account is changed. The checking and savings accounts are considered protected, critical resources because it is very important that data transfers involving the checking and savings accounts be handled reliably.

An application program can perform the two-phase commit procedure using a single command. Such a procedure consists of the following steps, or phases:

(1) During a prepare phase, each participant (debit and credit) resource is polled by the sync point manager to determine if the resource is ready to commit all changes. Each resource promises to complete the resource update if all resources successfully complete the prepare phase i.e. are ready to be updated.

(2) During a commit phase, the sync point manager directs all resources to finalize the updates or back them out if any resource could not complete the prepare phase successfully.

The above described two-phase commit procedure ensures consistency of modification of critical resources in most cases. It is possible, however, that a message sent by the application to the coupling facility (by executing the common queues system (CQS) PUT command) fails during the last stage of the commit procedure, when all the other participants of the protected conversation already committed changes. In such a case, the changes that have already been made can not be backed out because the protected resources are polled for readiness during the first phase of the commit procedure. This problem can be solved by retrying CQS PUT command for the failed message. If this retry succeeds, the consistency of the protected resources will be restored.

However, the conventional techniques fail to provide a method for retrying CQS PUT procedure to restore consistency in the state of protected system resources.

II. SUMMARY OF THE INVENTION

It is therefore an object of this invention to provide a method for retrying CQS PUT command for messages for which a prior CQS PUT command failed during the last phase of the commit procedure.

Specifically, it is an objective of the present invention to provide a method for handling failed common queues system (CQS) PUT requests using unit of work elements.

It is another objective of the present invention to provide a system for handling failed common queues system PUT requests.

To achieve the objectives and the advantages of the present invention there is provided a distributed computer system comprising a plurality of execution environments and a coupling facility, wherein: each of said plurality of execution environments comprises a private storage memory for storing unit of work elements; a system log data set and an online log data set for logging data related to the activity of each of said plurality of execution environments; and said coupling facility further comprises a message facility for facilitating message exchanges between an application running in one of said plurality of execution environments and another application running in one of: (i) said coupling facility; (ii) an execution environment different from said one of said plurality of execution environments; and (iii) said one of said plurality of execution environments.

Further improvements include the above distributed computer system wherein each of said stored unit of work elements has a log token pointing to a log record containing data relevant to said each of said stored unit of work element.

Still further improvements include the above distributed computer system wherein each of said stored unit of work elements comprises a disk relative record number pointing to a disk record containing data relevant to each of said stored unit of work elements.

Still further improvements include the above distributed computer system wherein each of said plurality of execution environments further has a retry logic for handling said stored unit of work elements and recommitting failed messages to said coupling facility, wherein said failed messages correspond to each of said stored unit of work elements.

Another aspect of this invention is a distributed computer system wherein a PUT request corresponding to a common queues server for a committed message fails in a first attempt, said system comprising a means for determining if a unit of work element corresponds to the committed message, a means for flagging said unit of work element for "retry", a means for accumulating said flagged unit of work elements in a private storage memory, a means for analyzing each of said flagged unit of work elements, a means for extracting a log token from each of said flagged unit of work elements, a means for using said log token to read a specific record from an IMS log data set, and a means for executing a second common queues server PUT command to send corresponding committed message to the coupling facility using said log record.

Yet another aspect of the present invention is a distributed computer system wherein a common queue server PUT request is handled comprising a means for determining if said common queues server PUT request failed; and a means for setting a common queues server PUT retry indicator and a log token in a corresponding unit of work element if said common queues server PUT request failed.

Still another aspect of the present invention is a distributed computer system wherein a failed common queues server PUT request fails said system comprising a means for reading an initial record, a means for determining if said initial record is a system log data set record or on-line log data set record, a means for performing following sub-steps if said record is a system log data set record: (i) reading log records from system log data set using log tokens; (ii) building a data object and setting a disk relative record number in a corresponding unit of work element; a means for performing the following sub-steps if said record is a on-line data set: (iii) reading log tokens from on-line data set; (iv) building a prefix update and setting a disk relative record number in a corresponding unit of work element; (v) building request list of all unit of work elements having common queues server PUT retry indicator; a means for performing the following sub-steps if each of said unit of work elements is determined to have a log token: (vi) reading log record from on-line log dataset using said log token; (vii) processing prefix update of the disk relative record number; a means for determining if a data object disk record number exists in said each of said unit of work elements if each of said unit of work elements is determined not to have a log token; and a means for executing common queues server PUT request for a data object to a coupling facility, if said log token exists and said data object disk record number exists.

Another aspect of the present invention is a method for handling a message corresponding to failed PUT request associated with a common queues server during a second phase of a two-phase commit procedure, said method comprising a step of retrying said PUT request.

Yet another aspect of the present invention is a method for retrying a PUT request corresponding to a common queues server for a committed message, wherein said PUT request failed in a first attempt, said method comprising: determining if a unit of work element corresponds to the committed message; flagging said unit of work element for "retry"; accumulating said flagged unit of work elements in a private storage memory; analyzing each of said flagged unit of work elements; extracting a log token from each of said flagged unit of work elements; using said log token to read a specific record from an IMS log data set; and executing a second common queues server PUT command to send corresponding committed message to the coupling facility using said log record.

Yet another aspect of the present invention is a method for handling a common queues server PUT request comprising steps of: determining if said common queues server PUT request failed; setting a common queues server PUT retry indicator and a log token in a corresponding unit of work element if said common queues server PUT request failed.

Yet another aspect of the present invention is a method for retrying failed common queues server PUT request comprising steps of: (a) reading an initial record; (b) determining if said read initial record is a system log data set record or on-line log data set record. (c) reading log records from system log data set using log tokens if said record in said step (b) is determined to be the system log data set record; (d) building a data object and setting a disk relative record number in a corresponding unit of work element if said record in said step (b) is determined to be the system log data set record; (e) reading log tokens from an on-line data set if said record in said step (b) is determined to be the on-line log data set record; (f) building a prefix update and setting a disk relative record number in a corresponding unit of work element if said record in said step (b) is determined to be the on-line log data set record; (g) building request list of all unit of work elements having common queues server PUT retry indicator; (i) determining if each of said unit of work elements has a log token; (j) reading log record from online log data set using said log token if said log token exists in step (i); (k) processing prefix update of the disk relative record number if said log token exists in step (i); (l) determining if a data object disk record number exists in said each of said unit of work elements, if the token if said log token does not exist in step (i); (m) executing common queues server PUT request for a data object to a coupling facility, if said log token exists in step (i) and said data object disk record number exists in said step (k).

Yet another aspect of the present invention is the above method, further comprising a step of determining the number of times when the common queues server PUT request has failed; comparing said number with a predetermined number of times; and aborting further retry attempts if the common queues server PUT command failed more that the predetermined number of times.

Another aspect of the present invention is a computer program product for a distributed computer system wherein a PUT request corresponding to a common queues server for a committed message fails in a first attempt, said program product including a computer readable medium comprising: a computer readable code for determining if a unit of work element corresponds to the committed message; a computer readable code for flagging said unit of work element for "retry"; a computer readable code for accumulating said flagged unit of work elements in a private storage memory; a computer readable code for analyzing each of said flagged unit of work elements; a computer readable code for extracting a log token from each of said flagged unit of work elements; a computer readable code for using said log token to read a specific record from an IMS log data set; and a computer readable code for executing a second common queues server PUT command to send corresponding committed message to the coupling facility using said log record.

Yet another aspect of the present invention is a computer program product for a distributed computer system said program product including a computer readable medium comprising: a computer readable code for determining if said common queues server PUT request failed; and a computer readable code for setting a common queues server PUT retry indicator and a log token in a corresponding unit of work element if said common queues server PUT request failed.

Yet another aspect of the present invention is a computer program product for a distributed computer system wherein a failed common queues server PUT request fails said program product including a computer readable medium comprising:

a computer readable code for reading an initial record;

a computer readable code for determining if said initial record is a system log data set record or on-line log data set record;

a computer readable code for performing following sub-steps if said record is a system log data set record:
 (i) reading log records from system log data set using log tokens;
 (ii) building a data object and setting a disk relative record number in a corresponding unit of work element;

a computer readable code for performing the following sub-steps if said record is a on-line data set:
 (iii) reading log tokens from on-line data set;
 (iv) building a prefix update and setting a disk relative record number in a corresponding unit of work element;
 (v) building request list of all unit of work elements having common queues server PUT retry indicator;

a computer readable code for performing the following sub-steps if each of said unit of work elements is determined to have a log token:
 (vi) reading log record from on-line log dataset using said log token;
 (vii) processing prefix update of the disk relative record number;

a computer readable code for determining if a data object disk record number exists in said each of said unit of work elements if each of said unit of work elements is determined not to have a log token; and a computer readable code for executing common queues server PUT request for a data object to a coupling facility, if said log token exists and said data object disk record number exists.

III. BRIEF DESCRIPTION OF THE DRAWINGS

The above objectives and advantages of the present invention will become more apparent by describing in detail preferred embodiments thereof with reference to the attached drawings in which.

IV. DETAILED DESCRIPTION OF THE INVENTION

Figure 1:
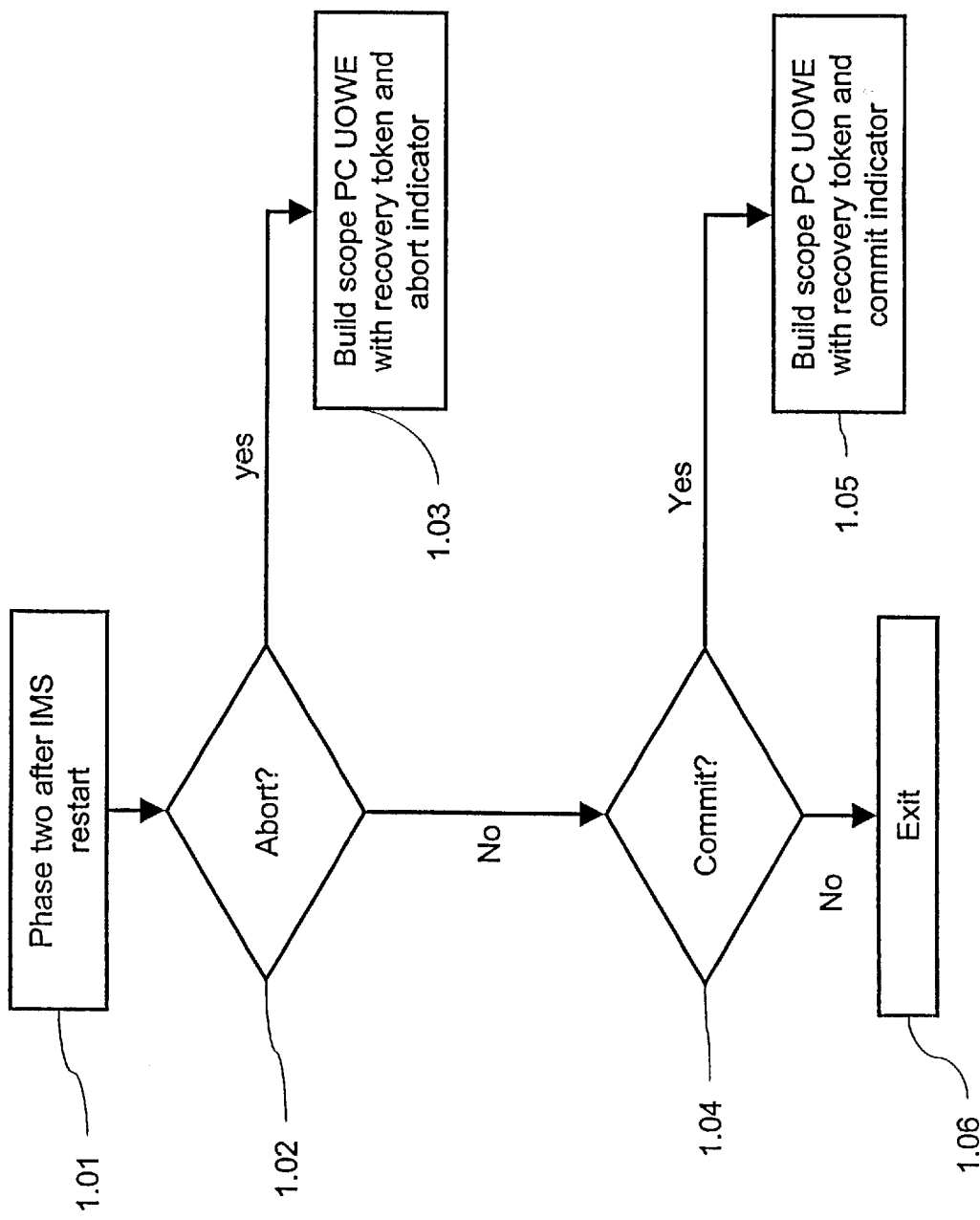
FIG. 1 illustrates the procedure used for handling a failure of a CQS PUT request for a message before the present invention.

The present invention provides a computer system where an application running in one of the plurality of execution environments can exchange messages with another application. The other application can run in the same or different execution environment. The applications can run on the same real machine or a different real machine. The application can also exchange messages with the coupling facility. It should be noted that though the preferred embodiments are described in terms of protected conversations, the scope of the present invention covers all IMS messages.

Synchronized message exchange between two applications, or an application and the coupling facility, conducted using a commit procedure is called a protected conversation. The participants of the protected conversation are called conversation partners.

A protected conversation protocol ensures consistency in the communication procedure. The message exchange between two participants in the conversation is synchronized using the commit procedure. The commit procedure is described in detail hereunder. In such a conversation, each message includes a command and a response. To send a message to a conversation partner, an application sends the message to the coupling facility. To facilitate such message exchanges, the coupling facility has a message facility which is used by applications during message exchanges.

IVA. Preferred Embodiment of a Structure of the Distributed Computer System of the Present Invention The preferred embodiment of a distributed computer system of the present invention has a plurality of execution environments and a coupling facility. The above components form real machines. These real machines, in turn, may be interconnected using a network. The execution environments may be based on central processing complexes (CPCs) running as IMS systems. The coupling facility facilitates information exchanges between the execution environments. Such a coupling facility includes a message facility used by the execution environments in message exchanges.

Structure of the Execution Environments

The execution environments forming part of the distributed computer system invention includes a central processing complex (CPC) with a private memory for storing unit of work elements (UOWE). It also includes a log facility for logging the activity of applications running in the corresponding execution environments.

The log facility comprises an online log data set (OLDS) and a system log data set (SLDS). Log data sets contain data associated with messages written to the coupling facility. The current activity logs are stored in the OLDS. The activity logs are archived as and filled into system log data sets. The system log data set contains four generations of the online log data set. As a newer version of the online data set is archived, the oldest version stored in the system log data set is deleted.

Structure of the Coupling Facility

The coupling facility contains a message facility that is used in a shared manner by multiple applications. This message facility is used in facilitating communications between applications running on the same or different execution environments or an application and the coupling facility. The coupling facility also includes a common queues server (CQS) having a plurality of queues that are shared by the applications running on the execution environments coupled by the coupling facility.

A more detailed description of an embodiment of a multiprocessing system having a coupling facility and communicating messages between the processors and the coupling facility is described in aforementioned U.S. Pat. No. 5,561,809, which is incorporated herein by reference.

IVB. Using Commit Procedure to Ensure Consistency in Modification of Protected Resources Using the protected conversations protocol in a message communication is described below. A detailed description of embodiments of this protocol may be found in U.S. Pat. Nos. 5,410,684; 5,363,505; and 5,319,774 which are incorporated herein by reference.

To synchronize and coordinate modifications to protected resources, such as protected files or protected conversations, special commit procedures are used. Typically a commit procedure has two phases: a polling or prepare phase and a back-out or commit phase. During the prepare phase a protected conversation manager polls the participants of the commit procedure to determine whether all the resources are ready to commit changes. Each resource promises to complete the resource update if all resources successfully complete their prepare phases i.e. are ready to be updated. During the commit phase, the sync point manager directs all resources to finalize the updates or back them out if any resource could not complete the prepare phase successfully.

IVC. Message Communications Via Protected Conversations within Distributed Computer System Communications and IMS messages between processes (applications) running in the same or different execution environments can be carried out by different means including shared memory, messages, semaphores, remote procedure calls, etc. Protected conversations using messages is one of the inter-process communication modes. According to this mode, a process running in the first execution environment uses a coupling facility to write out a message. This writing out is synchronized with writing of a message by the other application participating in the conversation. The synchronization is accomplished through the use of a commit procedure. The same communication scheme may be used for communications between an application and the coupling facility.

IVD. Retrying Failed CQS PUT Requests According to the Present Invention

A preferred embodiment that retries a failed CQS PUT request using the techniques of the present invention is described in detail. A message exchange according to the protected conversation protocol is accomplished in the following manner. For the purposes of the foregoing description the message facility wherein applications write messages constitutes a protected system resource, and is treated in the same manner as protected file or database. Therefore, a skilled artisan will realize that all these different forms of communications including IMS messages are within the scope of the present invention.

In the first stage of the protected conversation protocol, the participants of the protected conversation submit provisional changes. In practice such submission is accomplished by sending the entire message, except for the first segment of that message, to the coupling facility. After that, the two-phase commit procedure is invoked to ensure the consistency when committing the said changes. In the first phase of the commit procedure, the sync point manager polls the participants in the conversation to determine their readiness to commit the proposed changes. If all participants are ready to commit the changes, the sync point manager starts the second phase of the commit procedure by issuing all participating resources the request to commit the proposed changes. In response to the commit command of the sync point manager, the application issues a PUT command to put the message to the coupling facility.

When a message is being PUT into the coupling facility in the second stage, which is the last stage of commit procedure, the PUT command may fail for some reason. Such failure occurs, for example, due to a system crash. All the other participants of the conversation may have committed the changes, except for the present application, because during the first phase of the commit protocol the problem did not exist. This would create a&situation where changes in the protected resources are inconsistent. In case when one of the participant of the protected conversation is a user terminal and the message from the other participant, an application, fails; the damage may be minimal. In such a case, the user may be asked by the system to repeat the input and the entire conversation is started from scratch.

On the other hand, when the response to the message by an application fails, it may not always be possible to signal to the application requesting repeat of the previous output. Therefore the use of the retry procedure which is trying to "save" conversation becomes important.

FIG. 1 illustrates handling of the failed CQS PUT request by conventional systems. In response to the failure of CQS PUT request, the conventional systems would return error code to the application requesting the PUT operation, see FIG. 1, blocks 1.02 and 1.03. The requesting application will have to start the communication all over again from the first phase.

The present invention provides the protected conversation manager with an opportunity to retry putting the message to the coupling facility after the initial fault. In case this retry operation succeeds, the conversation will be saved. The present invention provides a procedure for handling such failed PUT commands. The procedure according to an embodiment of the present invention is described below.

First, according to the protected conversation protocol, a unit of work element (UOWE) is created to represent a message which was put out to the coupling facility. The UOWE is a record stored in a private storage of the IMS system. The record includes the following information:
(1) a retry flag that indicates that the message corresponding to that UOWE failed and scheduled for retry;
(2) a log token that points to the log records of the log data set of the IMS system containing information about the content of the failed message;
(3) a unit of work identifier uniquely defining the scope of the changes in the system;
(4) disk relative record number pointing to the disk record containing data associated with the failed message.

When the retry flag is set, it signals to the conversation manager that given UOWE represents failed message designated for retry. The log token contains information identifying the log records containing information about the original message to be written to the coupling facility.

Second, the "retry" UOWE described above accumulate in the private storage of the IMS. The entries from this private storage are being read by the retry logic. After reading UOWE from the designated private storage, the retry logic analyzes every retry request and attempts to retry putting corresponding message into the coupling facility. This retry process will be described below.

In the first step, the retry logic analyzes next UOWE from the queue. In the second step, the retry logic extracts the log token from this UOWE. This log token identifies log records in the IMS log data set that store information on the failed message. Then the retry logic uses the extracted token to read a specific log record from the IMS log database. After the contents of the failed message has been recovered from the logs, the logic attempts to put it again to the coupling facility.

Figure 2:
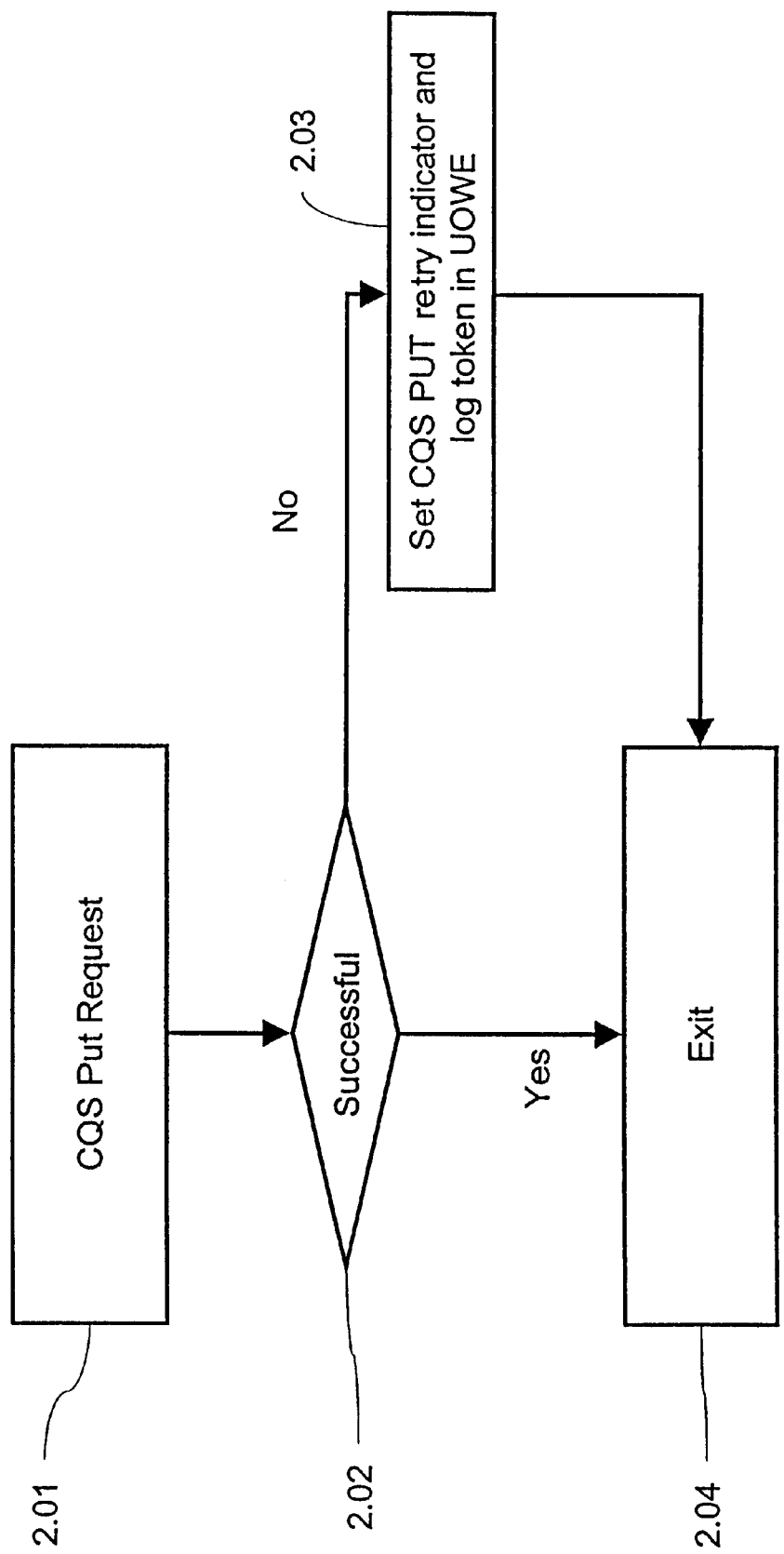
FIG. 2 illustrates the procedure for handling a failure of a CQS PUT request for a message according to the present invention.

Embodiments of the above described method for retrying PUT operation for messages according to the present invention will be illustrated below using the attached drawings. FIG. 2 illustrates operation of the PUT instruction according to the embodiment of the present invention. After issuing CQS PUT request, see FIG. 2, block 2.01, the system checks if the PUT operation was successful, block 2.02. If the PUT command was successful, the execution is transferred to the next command in the sequence. If CQS PUT request failed for some reason, a CQS PUT retry indicator and a log token in corresponding unit of work element are set and the unit of work element is placed into the IMS system private storage memory. The log token of the unit of work element identifies the record in the system log data set (SLDS) or the on-line log data set (OLDS) containing information about the failed message.

The unit of work element (UOWE) is a record that is created after initiation of a protected conversation. This record is stored in the private storage memory of the IMS system. If the started protected conversation completes successfully, the need for this record no longer exists; and it is deleted by the system. On the other hand, if the CQS PUT request is unsuccessful, for example due to a crash of the IMS system, the unit of work element is used to retry the failed CQS PUT operation later on.

Figure 3:
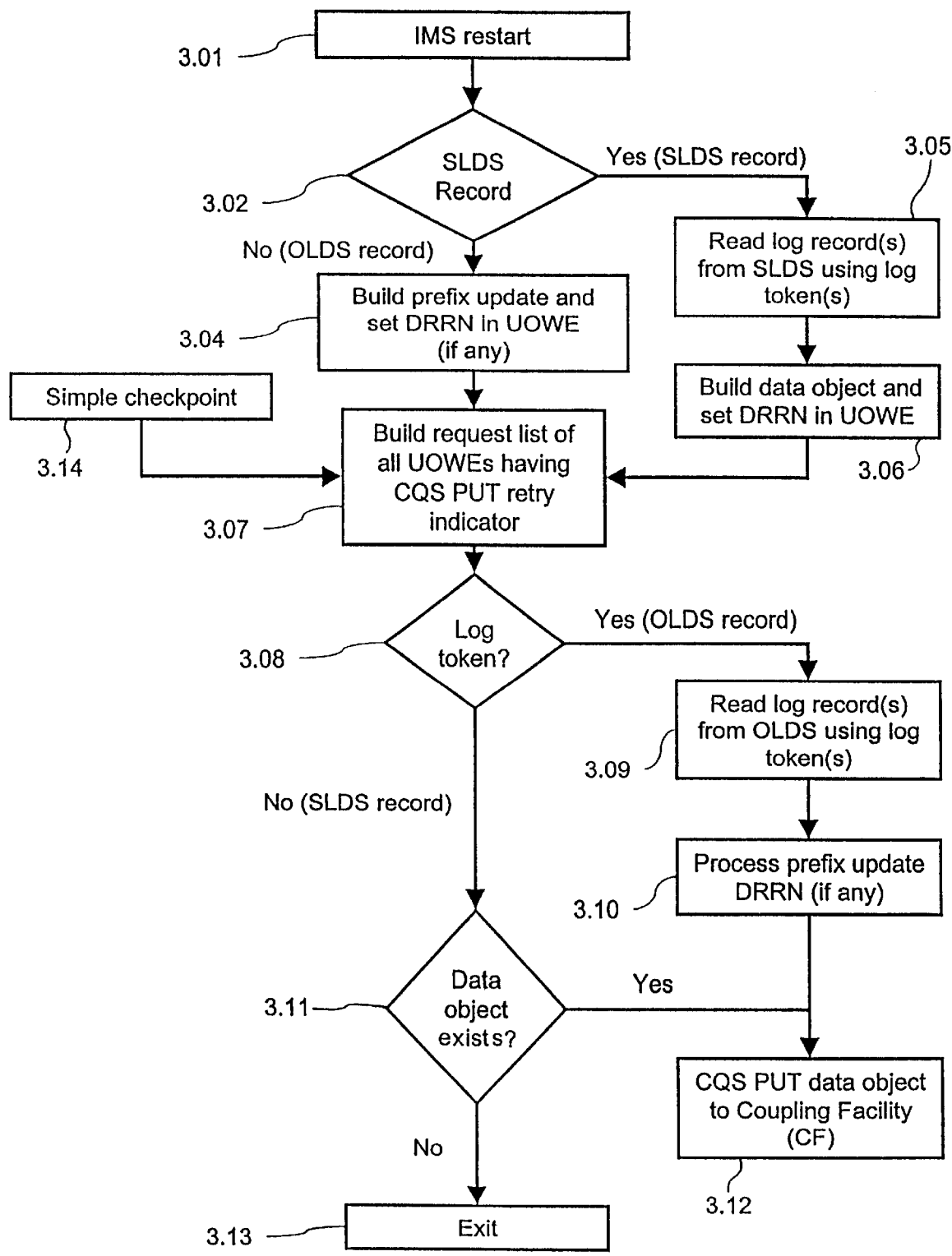
FIG. 3 illustrates operation of the retry procedure according to the present invention.

Upon the restart of the IMS after the system crash, the system checks whether the initial input record originates in the system log data set (SLDS), or the online log data set (OLDS), see FIG. 3, condition 3.02. If the initial record originates in the SLDS, additional log records are being read from the SLDS using pre-existing log tokens. The log records read from SLDS are then used to build up the UOWEs and corresponding data objects, see FIG. 3, blocks 3.05 and 3.06.

Data objects corresponding to a given UOWE are linked to that UOWE using disk relative record number (DRRN). This number points to disc records containing data associated with the given UOWE. The disk relative record number (DRRN) is a unique number that provides mechanism for combining data from different log buffers corresponding to the same UOWE. An internal logic of the IMS system accesses log buffers through their disc relative record numbers. Therefore, a protected conversation message is built from the system log data set, with multiple parts of the message being chained together using their disk relative record numbers.

If the initial record does not originate in the SLDS, then it must originate in the OLDS. In this case log tokens are read from the OLDS and only the prefix of the message is being updated, see FIG. 3, block 3.04. This prefix includes only the prefix DRRN. The procedure described above is performed as a part of a system restart procedure executed by the queue manager restart (QMR). The queue restart manager is a process that rebuilds the message queue of the system upon the system restart to restore the state of the message queue before the system shut down. The execution of the above procedure results in building the list of all UOWEs restored from the system log records. In the next step, shown in block 3.07, the system builds a request list of all UOWEs having CQS PUT retry indicator. These UOWEs are designated for retry.

Next, the system goes through the built request list analyzing each UOWE in that list. First, the system checks if a given UOWE contains a log token, see FIG. 3, block 3.08. If this token exists, this indicates that the corresponding log record should be received from the OLDS. Accordingly, the system reads the OLDS records corresponding to that log token, see block 3.09. The read records contain information on the command data corresponding to the protected conversation message. These data elements are linked to the UOWE using the prefix disk relative record number attribute of the UOWE, see block 3.10.

If the log token does not exist in the UOWE, then the record originates in the SLDS. In this case, the system checks the presence of the data object DRRN pointing to a data object containing control data as well as user data that are associated with the UOWE, see condition 3.11. If either type of data object exists, the system puts it to the coupling facility using CQS PUT request, see block 3.12.

The retry logic described above will use the foregoing procedure to retry CQS PUT requests for failed messages. It may be the case that the retry process will never succeed for a message due to some "hard" problem in the system, for instance due to a hardware problem in the message facility of the coupling facility.

Because processing multiple unsuccessful retries will burden system resources, it is desirable to limit the number of available retry attempts for a given message. Therefore, in the embodiment of the present invention after failure of a predetermined number of the retry requests, the system removes corresponding UOWE from the queue and uses special recovery utility, such as utility MRQ sold by the IBM Corporation, to recover information contained in the failed message.

Distributed computer systems with means to perform the above-described methods and computer program products with computer readable code that enable a computer to perform these methods are all within the scope of the present invention.

Described above are the embodiments of the present inventions. It will be apparent to a person of ordinary skill in the art that numerous modifications can be made thereto without deviating from the spirit of the invention.

What is claimed is:

1. A distributed computer system comprising a plurality of execution environments and a coupling facility, wherein:
   each of said plurality of execution environments comprises a private storage memory for storing unit of work elements; a system log data set and an online log data set each for logging data related to the activity of each of said plurality of execution environments; and
   said coupling facility further comprises a message facility for facilitating message exchanges between an application running in one of said plurality of execution environments and another application running in one of:
   (i) said coupling facility,
   (ii) an execution environment different from said one of said plurality of execution environments; and
   (iii) said one of said plurality of execution environments.

2. The distributed computer system of claim 1 wherein each of said stored unit of work elements has a log token pointing to a log record containing data relevant to said each of said stored unit of work elements.

3. The distributed computer system of claim 1 wherein each of said stored unit of work elements comprises a disk relative record number pointing to a disk record containing data relevant to each of said stored unit of work elements.

4. The distributed computer system of claim 1 wherein each of said plurality of execution environments further has a retry logic for handling said stored unit of work elements and re-committing failed messages to said coupling facility, wherein said failed messages correspond to each of said stored unit of work elements.

5. A distributed computer system wherein a PUT request corresponding to a common queues server for a committed message fails in a first attempt, said system comprising:
   a means for determining if a unit of work element corresponds to the committed message;
   a means for flagging said unit of work element for "retry";
   a means for accumulating said flagged unit of work elements in a private storage memory;
   a means for analyzing each of said flagged unit of work elements;
   a means for extracting a log token from each of said flagged unit of work elements;
   a means for using said log token to read a specific record from an IMS log data set; and
   a means for executing a second common queues server PUT command to send corresponding committed message to the coupling facility using said log record.

6. A distributed computer system wherein a common queue server PUT request is handled comprising:
   a means for determining if said common queues server PUT request failed; and
   a means for setting a common queues server PUT retry indicator and a log token in a corresponding unit of work element if said common queues server PUT request failed.

7. A distributed computer system wherein a failed common queues server PUT request fails said system comprising:
   a means for reading an initial record;
   a means for determining if said initial record is a system log data set record or on-line log data set record;
   a means for performing following sub-steps if said record is a system log data set record:
      (i) reading log records from system log data set using log tokens;
      (ii) building a data object and setting a disk relative record number in a corresponding unit of work element;
   a means for performing the following sub-steps if said record is a on-line data set:
      (iii) reading log tokens from on-line data set;
      (iv) building a prefix update and setting a disk relative record number in a corresponding unit of work element;
      (v) building request list of all unit of work elements having common queues server PUT retry indicator;
   a means for performing the following sub-steps if each of said unit of work elements is determined to have a log token:
      (vi) reading log record from on-line log dataset using said log token;
      (vii) processing prefix update of the disk relative record number;
   a means for determining if a data object disk record number exists in said each of said unit of work elements if each of said unit of work elements is determined not to have a log token; and a means for executing common queues server PUT request for a data object to a coupling facility, if said log token exists and said data object disk record number exists.

8. A method for retrying a PUT request corresponding to a common queues server for a committed message, wherein said PUT request failed in a first attempt, said method comprising:
   (a) determining if a unit of work element corresponds to the committed message;
   (b) flagging said unit of work element for "retry";
   (c) accumulating said flagged unit of work elements in a private storage memory;
   (d) analyzing each of said flagged unit of work elements;
   (e) extracting a log token from each of said flagged unit of work elements;
   (f) using said log token to read a specific record from an IMS log data set;
   (g) executing a second common queues server PUT command to send corresponding committed message to the coupling facility using said log record.

9. A method for handling a common queues server PUT request comprising:
   (a) determining if said common queues server PUT request failed;
   (b) setting a common queues server PUT retry indicator and a log token in a corresponding unit of work element if said common queues server PUT request in step (a) failed.

10. A method for retrying a failed common queues server PUT request comprising:
    (a) reading an initial record;
    (b) determining if said initial record is a system log data set record or on-line log data set record;
    (c) performing following sub-steps if said record in said step (b) is a system log data set record reading:
        (i) reading log records from system log data set using log tokens;
        (ii) building a data object and setting a disk relative record number in a corresponding unit of work element;
    (d) performing the following sub-steps if said record in step (b) is a on-line data set:
        (i) reading log tokens from on-line data set;
        (ii) building a prefix update and setting a disk relative record number in a corresponding unit of work element;
        (iii) building request list of all unit of work elements having common queues server PUT retry indicator;
    (e) performing the following sub-steps if each of said unit of work elements is determined to have a log token:
        (i) reading log record from on-line log dataset using said log token;
        (ii) processing prefix update of the disk relative record number;
    (f) determining if a data object disk record number exists in said each of said unit of work elements if each of said unit of work elements is determined not to have a log token;
    (g) executing common queues server PUT request for a data object to a coupling facility, if said log token exists and said data object disk record number exists.

11. The method according to claim 8, further comprising:
    (h) determining the number of times when the common queues server PUT command has failed;
    (i) comparing said determined number of times with a predetermined number of times; and
    (j) aborting further retry attempts if the common queues server PUT command failed more that the predetermined number of times.

12. A computer program product for a distributed computer system wherein a PUT request corresponding to a common queues server for a committed message fails in a first attempt, said program product including a computer readable medium comprising:
    a computer readable code for determining if a unit of work element corresponds to the committed message;
    a computer readable code for flagging said unit of work element for "retry";
    a computer readable code for accumulating said flagged unit of work elements in a private storage memory;
    a computer readable code for analyzing each of said flagged unit of work elements;
    a computer readable code for extracting a log token from each of said flagged unit of work elements;
    a computer readable code for using said log token to read a specific record from an IMS log data set; and
    a computer readable code for executing a second common queues server PUT command to send corresponding committed message to the coupling facility using said log record.

13. A computer program product for a distributed computer system wherein a failed common queues server PUT request fails said program product including a computer readable medium comprising:
    a computer readable code for determining if said common queues server PUT request failed; and
    a computer readable code for setting a common queues server PUT retry indicator and a log token in a corresponding unit of work element if said common queues server PUT request failed.

14. A computer program product for a distributed computer system wherein a failed common queues server PUT request fails said program product including a computer readable medium comprising:
    a computer readable code for reading an initial record;
    a computer readable code for determining if said initial record is a system log data set record or on-line log data set record;
    a computer readable code for performing following sub-steps if said record is a system log data set record:
        (i) reading log records from system log data set using log tokens;
        (ii) building a data object and setting a disk relative record number in a corresponding unit of work element;
    a computer readable code for performing the following sub-steps if said record is a on-line data set:
        (iii) reading log tokens from on-line data set;
        (iv) building a prefix update and setting a disk relative record number in a corresponding unit of work element;
        (v) building request list of all unit of work elements having common queues server PUT retry indicator;
    a computer readable code for performing the following sub-steps if each of said unit of work elements is determined to have a log token:
        (vi) reading log record from on-line log dataset using said log token;

(vii) processing prefix update of the disk relative record number;

a computer readable code for determining if a data object disk record number exists in said each of said unit of work elements if each of said unit of work elements is determined not to have a log token; and a computer readable code for executing common queues server PUT request for a data object to a coupling facility, if said log token exists and said data object disk record number exists.

\* \* \* \* \*